US012518710B2

(12) United States Patent
Zhang et al.

(10) Patent No.: US 12,518,710 B2
(45) Date of Patent: Jan. 6, 2026

(54) DRIVING CONTROL APPARATUS, DRIVING CONTROL METHOD AND DISPLAY APPARATUS

(71) Applicants: Chongqing BOE Optoelectronics Technology Co., Ltd., Chongqing (CN); BOE Technology Group Co., Ltd., Beijing (CN)

(72) Inventors: Ying Zhang, Beijing (CN); Can Shen, Beijing (CN); Jin Sha, Beijing (CN); Bo Ran, Beijing (CN); Xiang Fang, Beijing (CN); Chao Gao, Beijing (CN); Yao Chen, Beijing (CN); Yiming Cheng, Beijing (CN); Jinxiang Li, Beijing (CN); Shifei Huang, Beijing (CN); Shengjie Yin, Beijing (CN); Junrui Fang, Beijing (CN); Wendi Zhang, Beijing (CN); Jun Tao, Beijing (CN); Qiuju Xie, Beijing (CN); Zhou Zhang, Beijing (CN); Jun Wei, Beijing (CN); Hongchao Su, Beijing (CN)

(73) Assignees: Chongqing BOE Optoelectronics Technology Co., Ltd., Chongqing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/702,576

(22) PCT Filed: Apr. 17, 2023

(86) PCT No.: PCT/CN2023/088754
§ 371 (c)(1),
(2) Date: Apr. 18, 2024

(87) PCT Pub. No.: WO2023/226621
PCT Pub. Date: Nov. 30, 2023

(65) Prior Publication Data
US 2024/0412699 A1 Dec. 12, 2024

(30) Foreign Application Priority Data
May 25, 2022 (CN) .......................... 202210579608.9

(51) Int. Cl.
*G09G 3/34* (2006.01)
*G09G 3/36* (2006.01)

(52) U.S. Cl.
CPC ......... G09G 3/3406 (2013.01); G09G 3/3685 (2013.01); *G09G 2330/021* (2013.01)

(58) Field of Classification Search
CPC .. G09G 2330/021; G09G 3/3406; G09G 3/36; G09G 3/3685; G09G 3/3696
See application file for complete search history.

(56) References Cited

U.S. PATENT DOCUMENTS 11,875,752 B2 * 1/2024 Yang .................... G09G 3/3275
12,150,353 B2 * 11/2024 Han ..................... H10K 59/131
(Continued)

FOREIGN PATENT DOCUMENTS

CN 1588528 A 3/2005
CN 101211063 A 7/2008
(Continued)

*Primary Examiner* — Van N Chow
(74) *Attorney, Agent, or Firm* — IPro, PLLC

(57) ABSTRACT

A driving control apparatus, a driving control method and a display apparatus. When a display panel is in a power-on state and it is determined that a user leaves the display panel, a backlight stop signal (VBN) is first output, and a voltage stop signal (VPN) is then output. A backlight control circuit (320) stops operating in response to the backlight stop signal. In response to the voltage stop signal, a power switching circuit (330) stops outputting a driving voltage for driving the display panel to display a picture. When determining that the user returns to the front of the display panel, a voltage start signal (VPQ) can first be output, and a backlight start signal (VBQ) is then output. The backlight
(Continued)

control circuit starts to operate in response to the backlight start signal. The power switching circuit outputs the driving voltage in response to the voltage start signal.

19 Claims, 10 Drawing Sheets

(56) References Cited

U.S. PATENT DOCUMENTS

| | | | | |
|---|---|---|---|---|
| 2007/0001946 A1* | 1/2007 | Iwata | ............... | G09G 3/342 |
| | | | | 345/87 |
| 2016/0180779 A1* | 6/2016 | Suzuki | ............ | G09G 3/3406 |
| | | | | 345/694 |
| 2016/0191158 A1* | 6/2016 | Aoyama | ........... | H04B 10/54 |
| | | | | 398/172 |
| 2021/0335989 A1* | 10/2021 | Diao | ............... | H10K 59/131 |
| 2021/0359075 A1* | 11/2021 | Liu | ............... | H10K 50/813 |
| 2021/0398497 A1* | 12/2021 | Qiu | ............... | G09G 3/3406 |
| 2022/0147142 A1* | 5/2022 | Bui | ............... | G06V 40/166 |
| 2023/0165076 A1* | 5/2023 | Han | ............... | G09G 3/3233 |
| | | | | 257/72 |

FOREIGN PATENT DOCUMENTS

| | | | |
|---|---|---|---|
| CN | 101916551 | A | 12/2010 |
| CN | 103794189 | A | 5/2014 |
| CN | 204577063 | U | 8/2015 |
| CN | 108957816 | A | 12/2018 |
| CN | 209000516 | U | 6/2019 |
| CN | 110610678 | A | 12/2019 |
| CN | 114999405 | A | 9/2022 |
| JP | H05188869 | A | 7/1993 |
| KR | 20080022688 | A | 3/2008 |

* cited by examiner

DRIVING CONTROL APPARATUS, DRIVING CONTROL METHOD AND DISPLAY APPARATUS

CROSS-REFERENCE TO RELATED APPLICATIONS

The present disclosure is a national phase entry under 35 U.S.C § 371 of International Application No. PCT/CN2023/088754, filed Apr. 17, 2023, which claims priority to the Chinese Patent Application No. 202210579608.9, filed to China National Intellectual Property Administration on May 25, 2022, and entitled "Driving Control Apparatus, Driving Control Method and Display Apparatus", the entire content of which is incorporated herein by reference.

TECHNICAL FIELD

The present disclosure relates to the field of a display technology, in particular to a driving control apparatus, a driving control method and a display apparatus.

BACKGROUND

In a display such as a liquid crystal display (LCD), a plurality of pixel units are generally included. Each pixel unit may include: a red sub-pixel, a green sub-pixel, and a blue sub-pixel. A color picture is displayed by controlling the brightness corresponding to each sub-pixel to mix the desired display color.

SUMMARY

A driving control apparatus provided by embodiments of the present disclosure includes:
  a first control circuit, configured to, in a power-on state of a display panel, output a backlight stop signal and a voltage stop signal in response to determining that a user leaves the display panel, and output a backlight start signal and a voltage start signal in response to determining that the user returns to the front of the display panel; wherein an outputting moment of the backlight stop signal is before an outputting moment of the voltage stop signal, and an outputting moment of the backlight start signal is after an outputting moment of the voltage start signal;
  a backlight control circuit, configured to receive the backlight stop signal, and stop operating in response to the backlight stop signal; and receive the backlight start signal, and start operating in response to the backlight start signal; and
  a power switching circuit, configured to receive the voltage stop signal, and, in response to the voltage stop signal, stop outputting a driving voltage for driving the display panel to display an image; and receive the voltage start signal, and output the driving voltage in response to the voltage start signal.

In some examples, the driving voltage includes a gamma voltage, a power supply analog voltage and a power supply digital voltage;
  the driving control apparatus further includes: a source driving circuit, configured to load a data voltage on a data line in the display panel according to display data, the gamma voltage, the power supply analog voltage and the power supply digital voltage; and
  the power switching circuit is further configured to, in response to the voltage stop signal, successively stop outputting the gamma voltage, the power supply analog voltage and the power supply digital voltage in sequence; and to, in response to the voltage start signal, first start outputting the power supply digital voltage and then simultaneously start outputting the gamma voltage and the power supply analog voltage.

In some examples, the driving voltage further includes a first reference voltage and a second reference voltage;
  the driving control apparatus further includes: a level shifting circuit, configured to output a driving clock signal according to a reference clock control signal, the first reference voltage and the second reference voltage, to control the display panel to load a gate scanning signal on a gate line; and
  the power switching circuit is further configured to, subsequent to stopping outputting the gamma voltage and prior to stopping outputting the power supply analog voltage, simultaneously stop outputting the first reference voltage and the second reference voltage; and to, subsequent to starting outputting the power supply analog voltage, first start outputting the second reference voltage and then start outputting the first reference voltage.

In some examples, the driving voltage further includes a common electrode voltage;
  the power switching circuit is further configured to, upon stopping outputting the gamma voltage, stop outputting the common electrode voltage; and to, upon starting outputting the first reference voltage, start outputting the common electrode voltage.

In some examples, the power switching circuit is further configured to, upon stopping outputting the gamma voltage, trigger outputting a discharge enabling signal, to control a sub-pixel in the display panel to release an electric charge.

In some examples, the power switching circuit outputs the discharge enabling signal through a reset pin.

In some examples, the first control circuit is further configured to, in the power-on state of the display panel, output a discharge control signal in response to determining that the user leaves the display panel, wherein the outputting moment of the backlight stop signal is before an outputting moment of the discharge control signal, and the outputting moment of the discharge control signal is before the outputting moment of the voltage stop signal; and
  the power switching circuit is further configured to receive the discharge control signal, and output a discharge enabling signal in response to the discharge control signal, to control a sub-pixel in the display panel to release an electric charge.

In some examples, the power switching circuit outputs the discharge enabling signal through a reset pin.

In some examples, the first control circuit is further configured to, in the power-on state of the display panel, output a discharge enabling signal in response to determining that the user leaves the display panel, to control a sub-pixel in the display panel to release an electric charge; where the outputting moment of the backlight stop signal is before an outputting moment of the discharge enabling signal, and the outputting moment of the discharge enabling signal is before the outputting moment of the voltage stop signal.

In some examples, the driving control apparatus further includes: a sensor circuit;
  the sensor circuit is configured to, in the power-on state of the display panel, determine whether the user is in front of the display panel or not; and to issue a first determination signal to the first control circuit in response to determining that the user leaves the display panel, and issue a second determination signal to the first control circuit in response to determining that the user returns to the front of the display panel; and the first control circuit is further configured to determine that the user leaves the display panel upon receiving the first determination signal; and determine that the user returns to the front of the display panel upon receiving the second determination signal.

A driving control method provided by the embodiments of the present disclosure includes:

outputting, by a first control circuit, a backlight stop signal and a voltage stop signal in a power-on state of a display panel and in response to determining that a user leaves the display panel, wherein an outputting moment of the backlight stop signal is before an outputting moment of the voltage stop signal;

receiving, by a backlight control circuit, the backlight stop signal, and stopping, by the backlight control circuit, operating in response to the backlight stop signal;

receiving, by a power switching circuit, the voltage stop signal, and stopping, by the power switching circuit, outputting a driving voltage for driving the display panel to display an image in response to the voltage stop signal;

outputting, by the first control circuit, a backlight start signal and a voltage start signal in response to determining that the user returns to the front of the display panel; where an outputting moment of the backlight start signal is after an outputting moment of the voltage start signal;

receiving, by the power switching circuit, the voltage start signal, and outputting, by the power switching circuit, the driving voltage in response to the voltage start signal; and receiving, by the backlight control circuit, the backlight start signal, and starting, by the backlight control circuit, operating in response to the backlight start signal.

In some examples, the driving voltage includes a gamma voltage, a power supply analog voltage and a power supply digital voltage;

the stopping outputting a driving voltage for driving the display panel to display an image includes:

stopping outputting the gamma voltage, the power supply analog voltage and the power supply digital voltage successively in sequence, and triggering outputting a discharge enabling signal upon stopping outputting the gamma voltage, to control a sub-pixel in the display panel to release an electric charge.

In some examples, the first control circuit, in the power-on state of the display panel, further outputs a discharge control signal in response to determining that the user leaves the display panel; where the outputting moment of the backlight stop signal is before an outputting moment of the discharge control signal, and the outputting moment of the discharge control signal is before the outputting moment of the voltage stop signal; and the power switching circuit further receives the discharge control signal and outputs the discharge enabling signal in response to the discharge control signal, to control a sub-pixel in the display panel to release an electric charge.

In some examples, the first control circuit, in the power-on state of the display panel, further outputs a discharge enabling signal in response to determining that the user leaves the display panel, to control a sub-pixel in the display panel to release an electric charge; where the outputting moment of the backlight stop signal is before an outputting moment of the discharge enabling signal, and the outputting moment of the discharge enabling signal is before the outputting moment of the voltage stop signal.

A display apparatus provided by the embodiments of the present disclosure includes the above driving control apparatus.

DETAILED DESCRIPTION

Figure 1A:
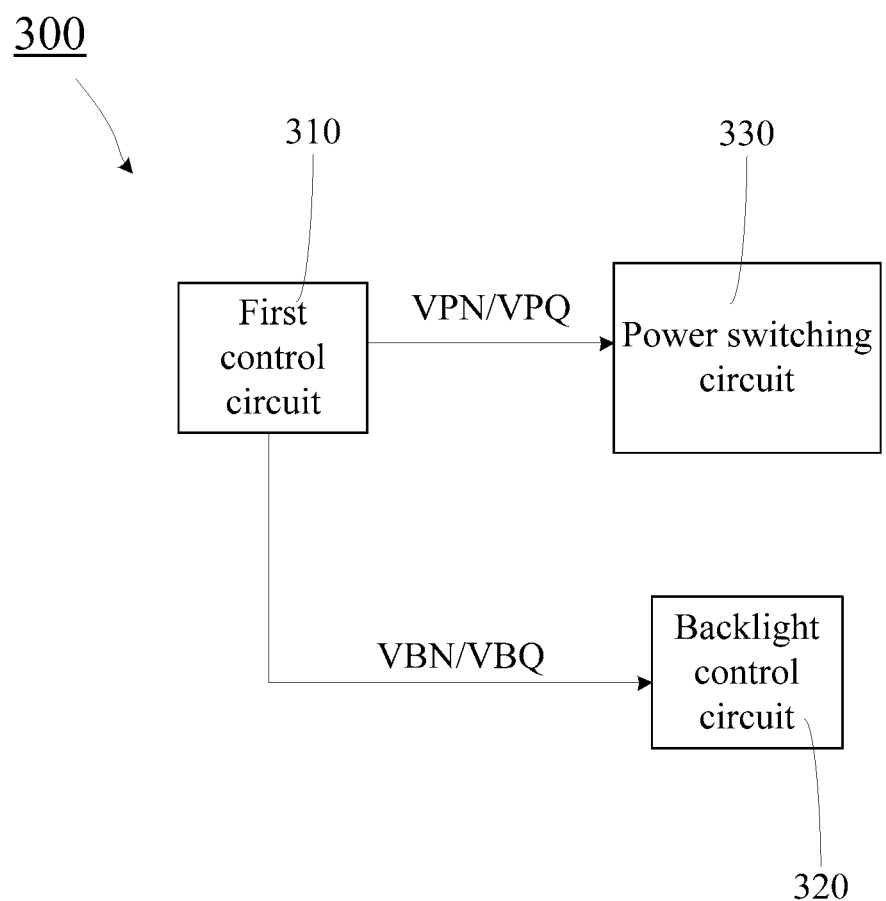
FIG. 1A is some schematic structural diagrams of a driving control apparatus in an embodiment of the present disclosure.

In order to make objectives, technical solutions, and advantages of embodiments of the present disclosure clearer, the technical solutions of the embodiments of the present disclosure will be described clearly and completely in conjunction with the drawings of the embodiments of the present disclosure. Obviously, the described embodiments are part of the embodiments of the present disclosure, rather than all of the embodiments. Without conflict, embodiments and features in the embodiments of the present disclosure may be combined with each other. Based on the described embodiments of the present disclosure, all other embodiments obtained by those of ordinary skill in the art without creative labor fall within the protection scope of the present disclosure.

Unless otherwise defined, technical terms or scientific terms used in the present disclosure shall have common meanings understood by those of ordinary skill in the art to which the present disclosure belongs. "First", "second" and similar words used in the present disclosure do not indicate any order, quantity or importance, but are only used to distinguish different components. "Include" or "comprise" and other similar words mean that elements or items appearing before the word cover the elements or items listed after the word and their equivalents, but do not exclude other elements or items. Similar words such as "connected" or "coupled" are not limited to physical or mechanical connections, but may include electrical connections, whether direct or indirect.

It should be noted that dimensions and shapes of various figures in the drawings are not to scale and are intended to be merely illustrative of the present disclosure. The same or similar reference numerals refer to the same or similar elements or elements having the same or similar functions throughout.

Figure 1B:
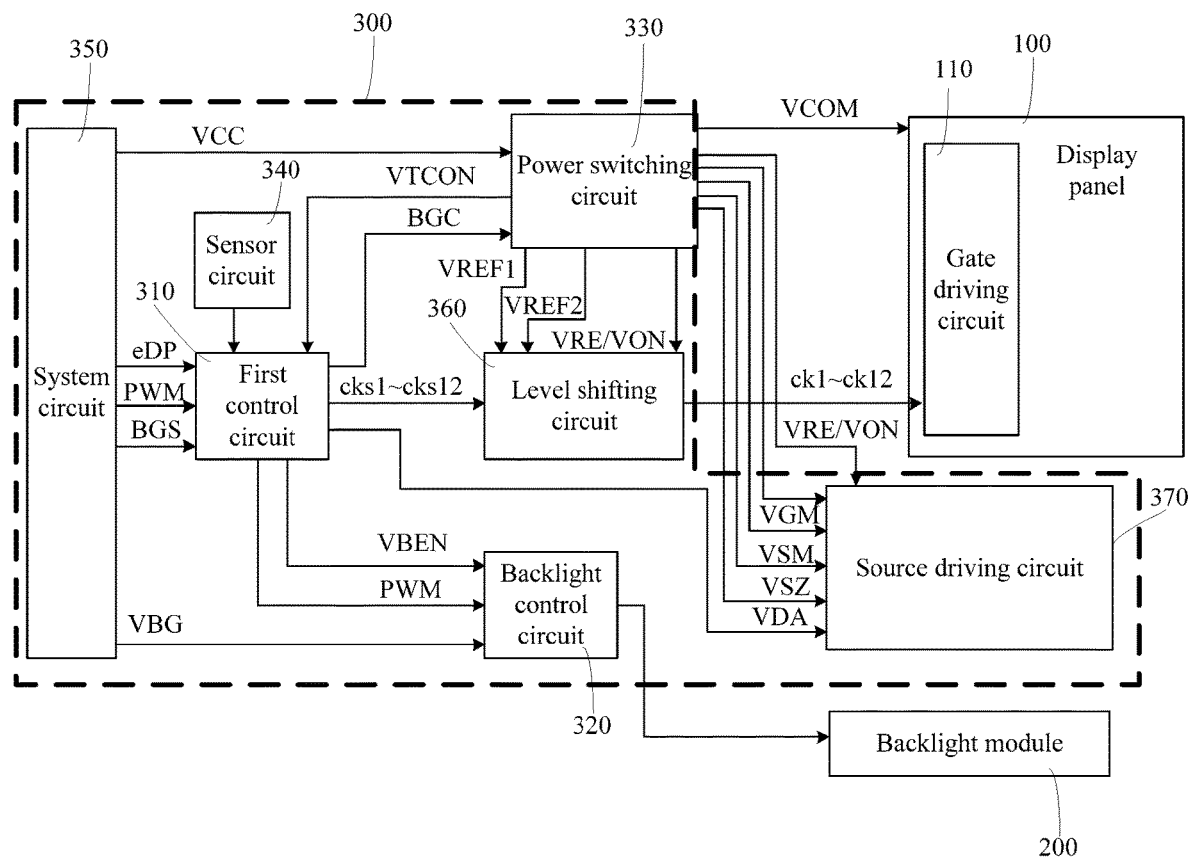
FIG. 1B is some schematic structural diagrams of a display apparatus in an embodiment of the present disclosure.
Figure 2:
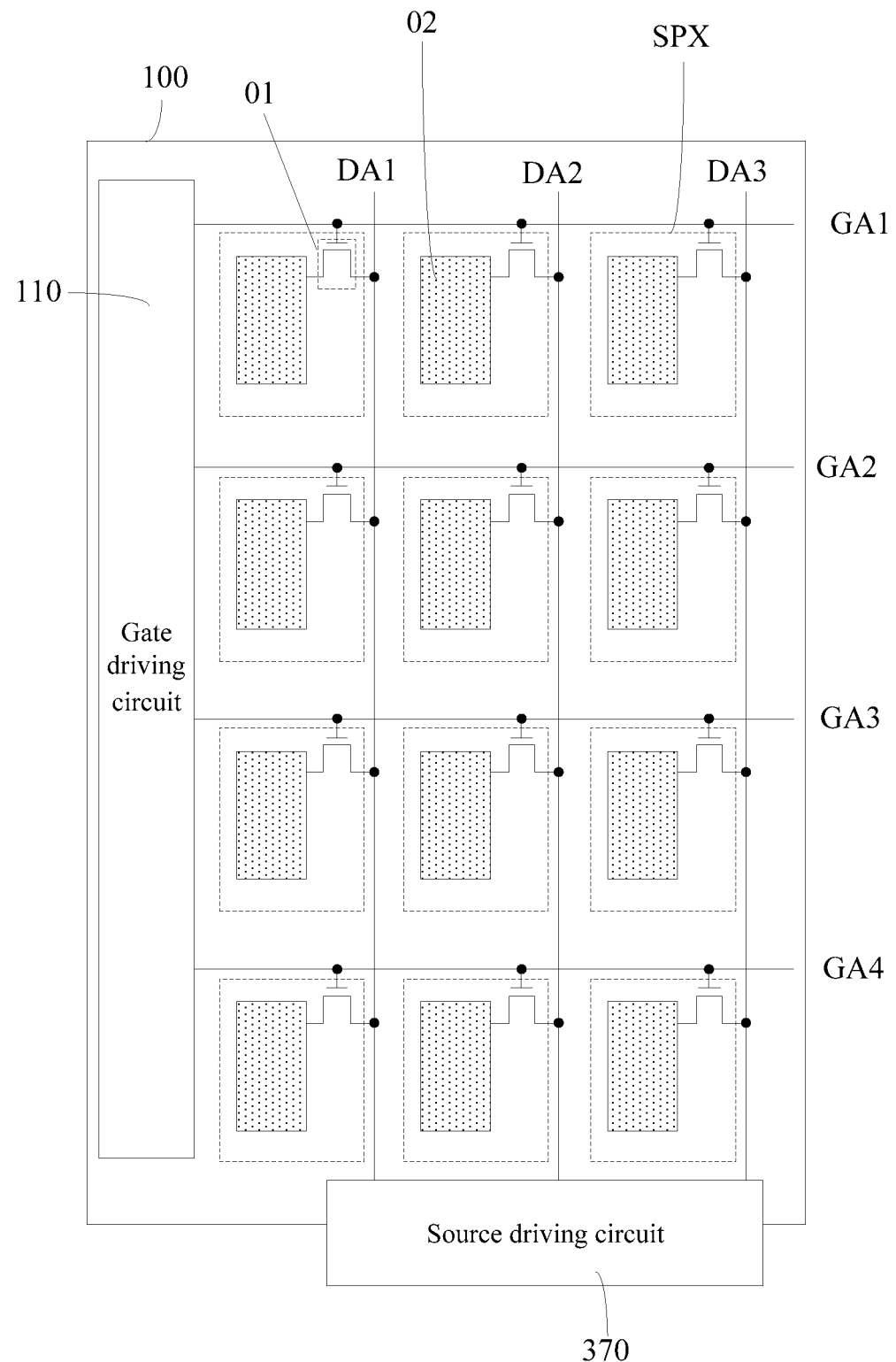
FIG. 2 is some schematic structural diagrams of a display panel in an embodiment of the present disclosure.
Figure 3A:
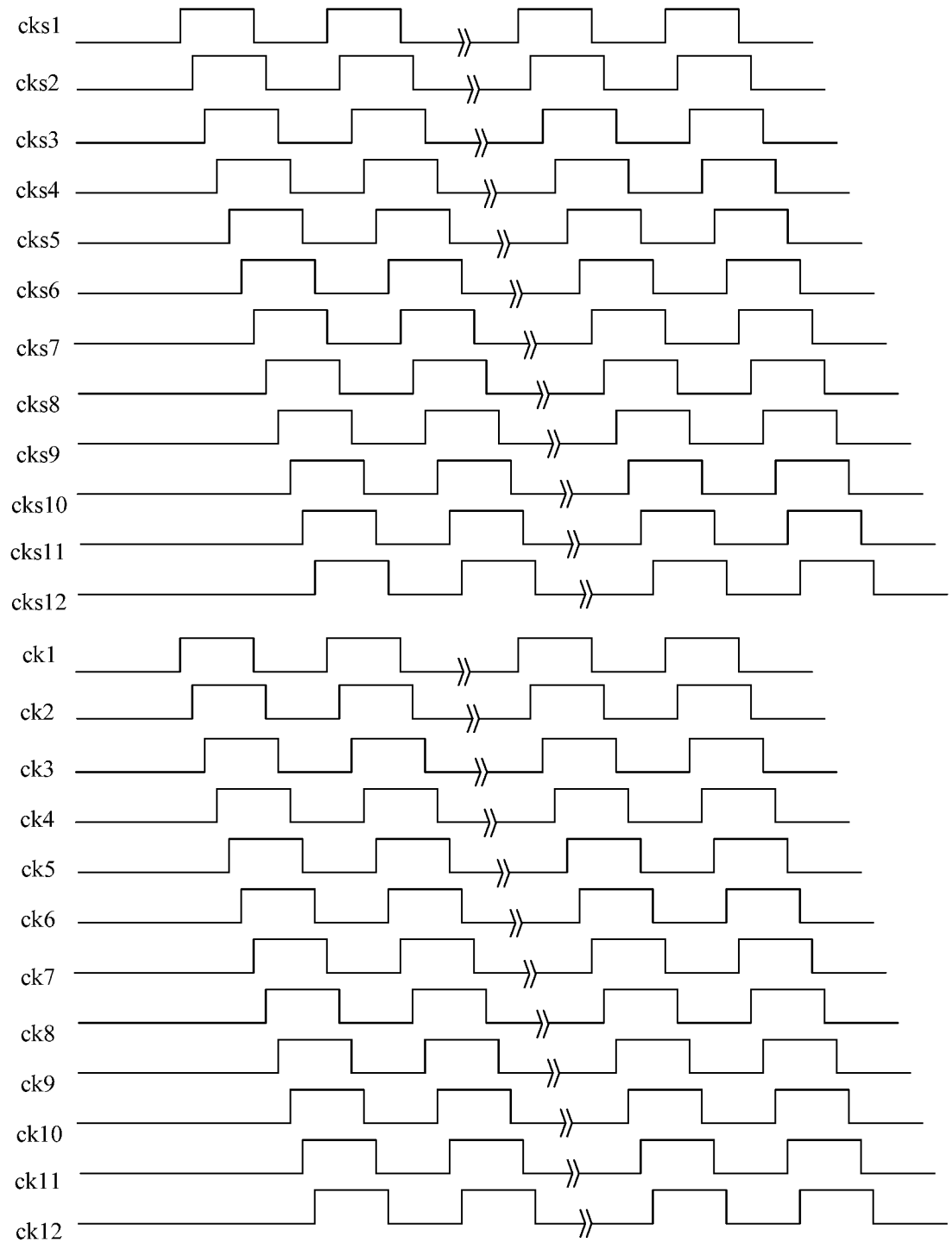
FIG. 3A is a timing chart of some signals in an embodiment of the present disclosure.
Figure 3B:
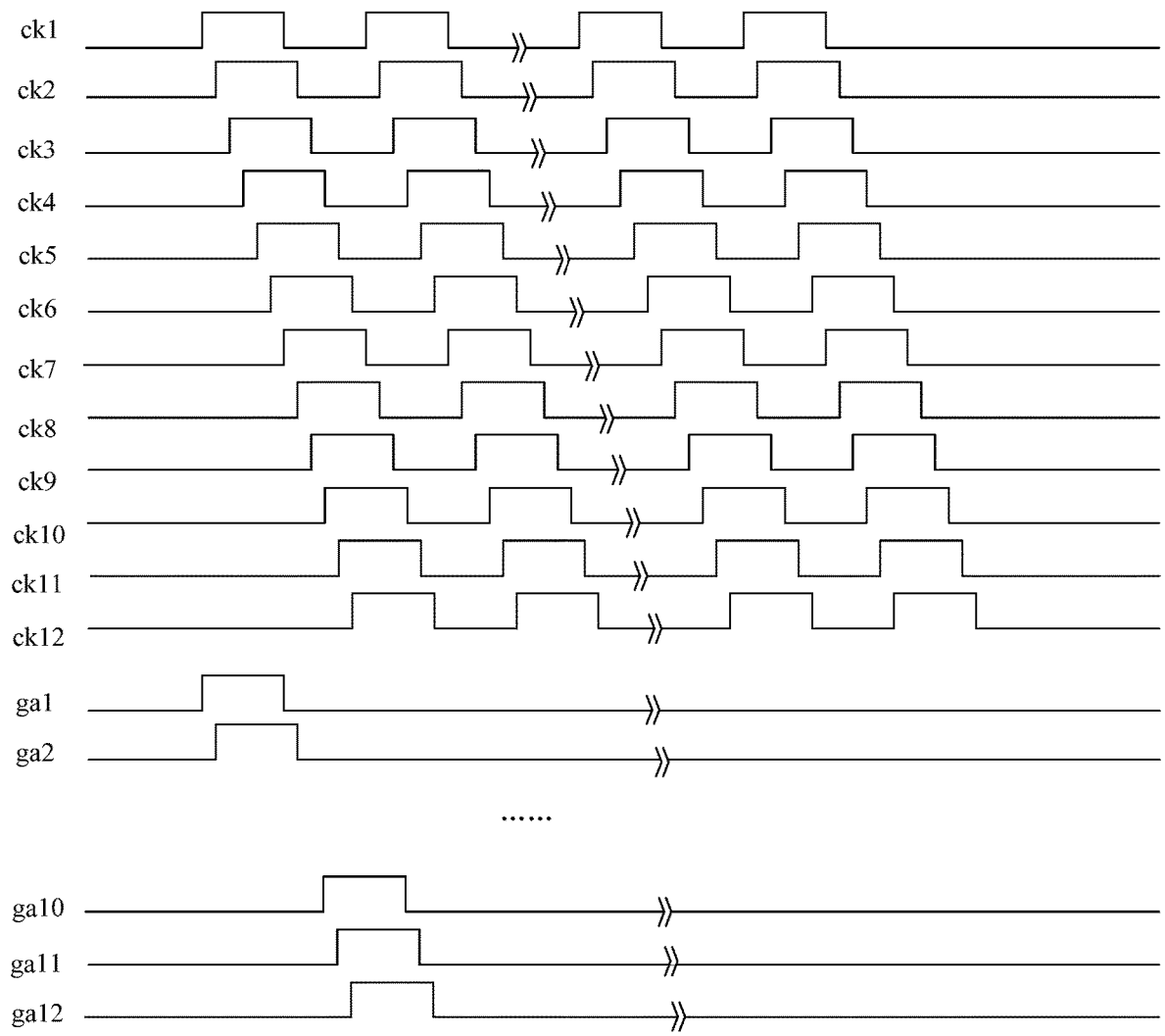
FIG. 3B is another timing chart of some signals in an embodiment of the present disclosure.

As shown in FIG. 1A to FIG. 2, a display apparatus provided by embodiments of the present disclosure includes a display panel 100, a backlight module 200 and a driving control apparatus 300. The display panel 100 may include: a plurality of pixel units arranged in an array, a plurality of gate lines GA (for example, GA1, GA2, GA3, and GA4), a plurality of data lines DA (for example, DA1, DA2, and DA3), and a gate driving circuit 110. The gate driving circuit 110 is respectively coupled with the gate lines GA1, GA2, GA3, and GA4. Exemplarily, each pixel unit includes a plurality of sub-pixels SPX. For example, the pixel unit may include a red sub-pixel, a green sub-pixel, and a blue sub-pixel, so that red, green and blue may be mixed to realize color display. Or, the pixel unit may further include a red sub-pixel, a green sub-pixel, a blue sub-pixel and a white sub-pixel, so that red, green, blue and white may be mixed to realize color display. Of course, in practical application, a light emitting color of each sub-pixel in the pixel unit may be designed and determined according to a practical application environment, which is not limited here.

As shown in FIG. 2, each sub-pixel SPX may include a transistor 01 and a pixel electrode 02. One row of sub-pixels SPX corresponds to one gate line, and one column of sub-pixels SPX corresponds to one data line. A gate of each transistor 01 is electrically connected with the corresponding gate line, a source of each transistor 01 is electrically connected with the corresponding data line and a drain of each transistor 01 is electrically connected with the corresponding pixel electrode 02. It should be noted that, an array structure of the pixels in the present disclosure may also be a double-gate structure, that is, two gate lines are arranged between two adjacent rows of sub-pixels. Through this arrangement pattern, half of the data lines may be reduced, that is, there may be a data line between two adjacent columns of sub-pixels and there may be no data line between other two adjacent columns of sub-pixels. A specific arrangement structure of the sub-pixels and arrangement patterns of the data lines and scan lines are not limited here.

In the embodiments of the present disclosure, the display panel in the embodiments of the present disclosure may be a liquid crystal display panel. Exemplarily, the liquid crystal display panel generally includes an upper substrate and a lower substrate which are aligned with each other, as well as liquid crystal molecules packaged between the upper substrate and the lower substrate. When an image is displayed, a voltage difference exists between a data voltage loaded on the pixel electrode of each sub-pixel SPX and a common electrode voltage VCOM on a corresponding common electrode, and an electric field may be formed by the voltage difference, so that the liquid crystal molecules undergo deflection under the effect of the electric field. As different intensities of electric fields result in varying degrees of deflection of the liquid crystal molecules, the sub-pixels SPX are different in transmittance, so brightness of different grayscales of light emitted by the backlight module may be achieved through the sub-pixels SPX with varying transmittance, thus realizing image display.

In practical application, as refresh rates, resolutions, and sizes of the display screen increase, power consumption during image display of the display panel becomes a significant challenge. For example, a high refresh rate product with a refresh rate of 480 Hz consumes approximately 7 W of power under heavy load. A backlight module using a mini LED as a light source typically consumes over 20 W of power, while a backlight module using a non-mini LED light source consumes around 4 W of power. Therefore, in scenarios where the display apparatus remains active for extended periods, especially when a user temporarily walks away without activating a sleep mode, if the user does not want to turn off the display apparatus but does not need the display apparatus to display the image, unnecessary power consumption occurs if the display apparatus continues to display normally.

In the embodiments of the present disclosure, as shown in FIG. 1A and FIG. 1B, the driving control apparatus 300 may include: a first control circuit 310, a backlight control circuit 320 and a power switching circuit 330. The first control circuit 310 is configured to, in a power-on state of the display panel 100, output a backlight stop signal VBN and a voltage stop signal VPN in response to determining that a user leaves the display panel 100, and output a backlight start signal VBQ and a voltage start signal VPQ in response to determining that the user returns to the front of the display panel 100. An outputting moment of the backlight stop signal VBN is before an outputting moment of the voltage stop signal VPN, and an outputting moment of the backlight start signal VBQ is after an outputting moment of the voltage start signal VPQ. The backlight control circuit 320 in operation may drive the backlight module 200 to emit light. The backlight control circuit 320 is configured to receive the backlight stop signal VBN, and stop operating in response to the backlight stop signal VBN; and receive the backlight start signal VBQ, and start operating in response to the backlight start signal VBQ. The power switching circuit 330 is configured to receive the voltage stop signal VPN, and, in response to the voltage stop signal VPN, stop outputting a driving voltage for driving the display panel 100 to display an image; and receive the voltage start signal VPQ, and, in response to the voltage start signal VPQ, output the driving voltage.

According to the above driving control apparatus provided by the embodiments of the present disclosure, in the power-on state of the display panel, in response to determining that the user leaves the display panel, in order to lower energy consumption, the driving control apparatus may first output the backlight stop signal VBN and then output the voltage stop signal VPN. Upon receiving the backlight stop signal VBN, the backlight control circuit stops operating in response to the backlight stop signal VBN, so as to cause the backlight module to stop emitting light and to turn off a screen of the display panel. Upon receiving the voltage stop signal VPN, the power switching circuit stops outputting the driving voltage for driving the display panel to display the image in response to the voltage stop signal VPN, so that joint control may be achieved over the backlight control circuit and the power switching circuit so as to lower the energy consumption. Meanwhile, the backlight control circuit is first controlled to stop operating and then the power switching circuit is controlled to stop operating, so that abnormal display may be avoided. Upon determining that the user returns to the front of the display panel, the voltage start signal VPQ may be first output and then the backlight start signal VBQ is output. Upon receiving the backlight start signal VBQ, the backlight control circuit starts operating in response to the backlight start signal VBQ so as to enable the backlight module to start emitting light. Upon receiving the voltage start signal VPQ, the power switching circuit outputs the driving voltage in response to the voltage start signal VPQ, so that the display panel may be caused to start displaying the image.

In some embodiments of the present disclosure, the first control circuit may include a timing controller (TCON). Of course, specific implementations of the first control circuit may adopt other implementation modes, which is not limited herein.

In some embodiments of the present disclosure, the backlight control circuit may include a backlight driving integrated circuit (IC). Of course, specific implementations of the backlight control circuit may adopt other implementation modes, which is not limited herein.

In some embodiments of the present disclosure, the power switching circuit may include a power management integrated circuit (PMIC). Of course, specific implementations of the power switching circuit may adopt other implementation modes, which is not limited herein.

In some embodiments of the present disclosure, as shown in FIG. 1A to FIG. 2, the driving control apparatus 300 may further include: a sensor circuit 340, a system circuit 350, a level shifting circuit 360 and a source driving circuit 370. The sensor circuit 340 is configured to, in the power-on state of the display panel 100, determine whether the user is in front of the display panel 100 or not; and to, in response to determining that the user leaves the display panel 100, issue a first determination signal to the first control circuit 310, and, in response to determining that the user returns to the front of the display panel 100, issue a second determination signal to the first control circuit 310. The first control circuit 310 is further configured to, in the power-on state of the display panel 100 and upon receiving the first determination signal, determine that the user leaves the display panel 100; and, upon receiving the second determination signal, determine that the user returns to the front of the display panel 100. The source driving circuit 370 may be connected with the display panel 100 in a bonding manner, so that the source driving circuit 370 is coupled with the data lines DA1, DA2 and DA3.

Exemplarily, the sensor circuit may be at least one of an infrared sensor circuit, or a figure line sensor circuit (e.g., a camera). Of course, specific implementations of the sensor circuit may adopt other implementation modes, which is not limited herein.

Exemplarily, as shown in FIG. 1A to FIG. 3B, the system circuit 350 is configured to output a power voltage VCC (e.g., 3.3V), obtain display data of a to-be-displayed image, and send the display data to the first control circuit 310. The power switching circuit 330 is configured to receive the power voltage VCC (e.g., 3.3V), supply power to itself, and output a timing power supply voltage VTCON (e.g., 1.8V and 0.9V), a gamma voltage VGM, a power supply analog voltage VSM, a power supply digital voltage VSZ, a first reference voltage VREF1, a second reference voltage VREF2 (the second reference voltage VREF2 is smaller than the first reference voltage VREF1), and a common electrode voltage VCOM according to the power voltage VCC. The first control circuit 310 is configured to receive the timing power supply voltage VTCON (e.g., 1.8V and 0.9V) to supply power to itself. Meanwhile, the first control circuit 310 and the system circuit 350 may be connected via an eDP interface to enable communication between the first control circuit 310 and the system circuit 350 via the eDP interface. The first control circuit 310 receives the display data through the eDP interface, and based on the received display data, sends reference clock control signals cks1 to cks12 (cks1 to cks12 are merely illustrative, and of course there may be other reference clock control signals, which is not limited herein) to the level shifting circuit 360, as well as sends the corresponding display data VDA to the source driving circuit 370. The level shifting circuit 360 receives the first reference voltage VREF1, the second reference voltage VREF2, and the reference clock control signals cks1 to cks12, and generates clock signals ck1 to ck12 according to the received first reference voltage VREF1, the second reference voltage VREF2, and the reference clock control signals cks1 to cks12 to control the display panel 100 to load gate scanning signals ga1 to ga12 to the gate lines. Specifically, the generated clock signals ck1 to ck12 are sent to a gate driving circuit 110, the gate driving circuit 110 outputs the gate scanning signals ga1 to ga12 to the gate lines based on the received clock signals ck1 to ck12, so that a high level (which may also be a low level) of the gate scanning signals ga1 to ga12 controls the transistors in the sub-pixels to be turned on. The clock signal ck1 to ck12 input to the gate driving circuit 110 are in one-to-one correspondence to the reference clock control signals cks1 to cks12, and the clock signals ck1 to ck12 input to the gate driving circuit 110 have the same timing as the corresponding reference clock control signals cks1 to cks12. The first reference voltage VREF1 is used to generate a voltage at a high level of the clock signals ck1 to ck12, i.e., the voltage at the high level of the clock signals ck1 to ck12 is the first reference voltage VREF1. The second reference voltage VREF2 is used to generate a voltage at a low level of the clock signals ck1 to ck12, i.e., the voltage at the low level of the clock signals ck1 to ck12 is the second reference voltage VREF2. In this way, a voltage at a high level of the gate scanning signals ga1 to ga12 is also the first reference voltage VREF1, and a voltage at a low level of the gate scanning signals ga1 to ga12 is also the second reference voltage VREF2. In addition, the source driving circuit 370 is configured to receive the display data VDA, the gamma voltage VGM, the power supply analog voltage VSM, and the power supply digital voltage VSZ and to, according to the display data VDA, the gamma voltage VGM, the power supply analog voltage VSM, and the power supply digital voltage VSZ, load a data voltage to the data lines in the display panel 100. In this way, when the transistors in the sub-pixels are turned on, the data voltage on the data lines may be input into the pixel electrodes so that the sub-pixels may realize their brightness, thereby realizing the function of image display.

Exemplarily, the level shifting circuit 360 may include a level shift (LS). Of course, the specific implementations of the level shifting circuit 360 may adopt other implementation modes, which is not limited herein. In conjunction with FIG. 3A and FIG. 3B, the level shifting circuit 360 generates the clock signal ck1 according to the timing of the reference clock control signal cks1, as well as the first reference voltage VREF1 and the second reference voltage VREF2. The level shifting circuit 360 generates the clock signal ck2 according to the timing of the reference clock control signal cks2, as well as the first reference voltage VREF1 and the second reference voltage VREF2. The level shifting circuit 360 generates the clock signal ck3 according to the timing of the reference clock control signal cks3, as well as the first reference voltage VREF1 and the second reference voltage VREF2 . . . the level shifting circuit 360 generates the clock signal ck12 according to the timing of the reference clock control signal cks12, as well as the first reference voltage VREF1 and the second reference voltage VREF2.

Exemplarily, the source driving circuit 370 may include a source driving IC. Of course, specific implementations of the source driving circuit 370 may adopt other implementation modes, which is not limited herein.

Exemplarily, the system circuit 350 may include a system on chip (SOC). Of course, specific implementations of the system circuit 350 may adopt other implementation modes, which is not limited herein. Exemplarily, the sensor circuit 340 may be integrated into the system circuit 350 to improve the integration of the system circuit 350. Or, the sensor circuit 340 may be integrated into the first control circuit 310 to improve the integration of the first control circuit 310.

Figure 4:
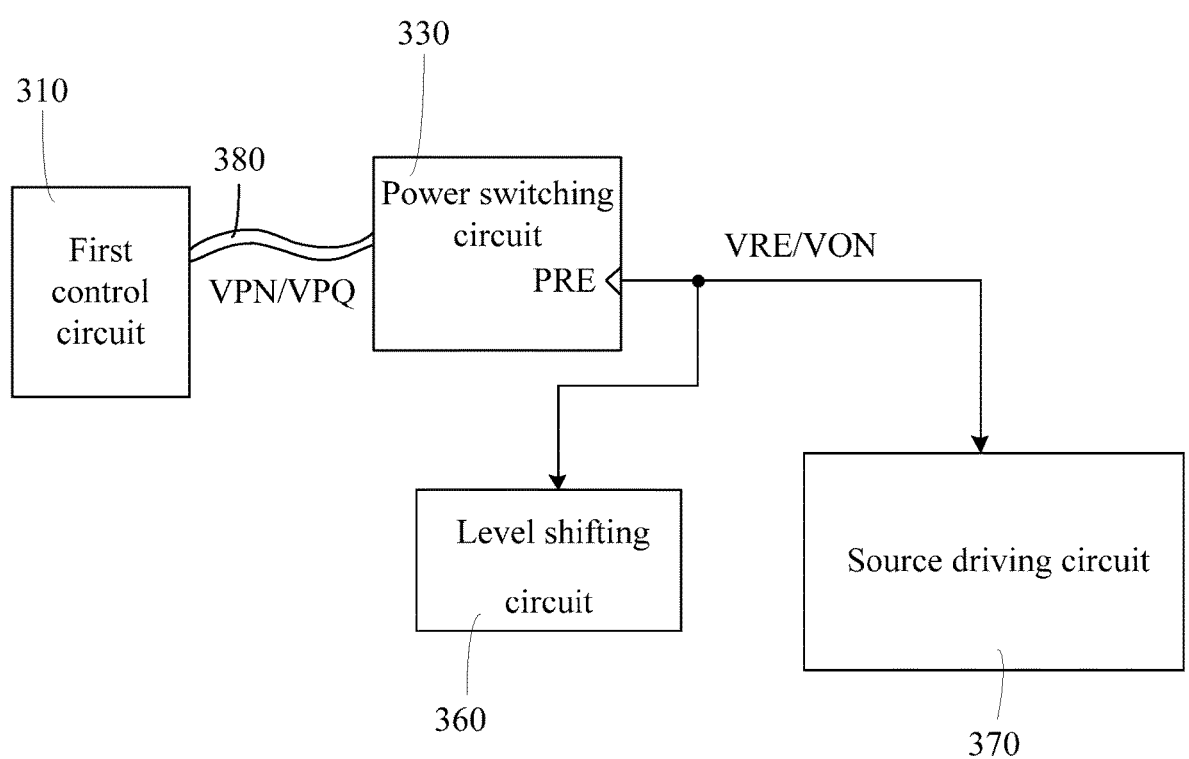
FIG. 4 is some schematic structural diagrams of a driving control apparatus in an embodiment of the present disclosure.

In some embodiments of the present disclosure, as shown in FIG. 4, the system circuit 350 is configured to output a backlight power supply voltage VBG (e.g., 12V), a backlight trigger control signal BGS, and a backlight brightness control signal PWM. A backlight driving chip receives the backlight power supply voltage (e.g., 12V) to supply power to itself. The first control circuit 310 also receives the backlight trigger control signal BGS and the backlight brightness control signal PWM through the eDP interface, and sends the received backlight brightness control signal PWM to the backlight driving chip. Meanwhile, the first control circuit 310 also initiates a function of controlling the backlight driving chip in response to the backlight trigger control signal BGS. The first control circuit 310 may output a backlight start signal VBQVBEN. The backlight control circuit receives the backlight start signal VBQVBEN and, in response to the backlight start signal VBQVBEN, initiates a function of controlling the backlight module.

Figure 5A:
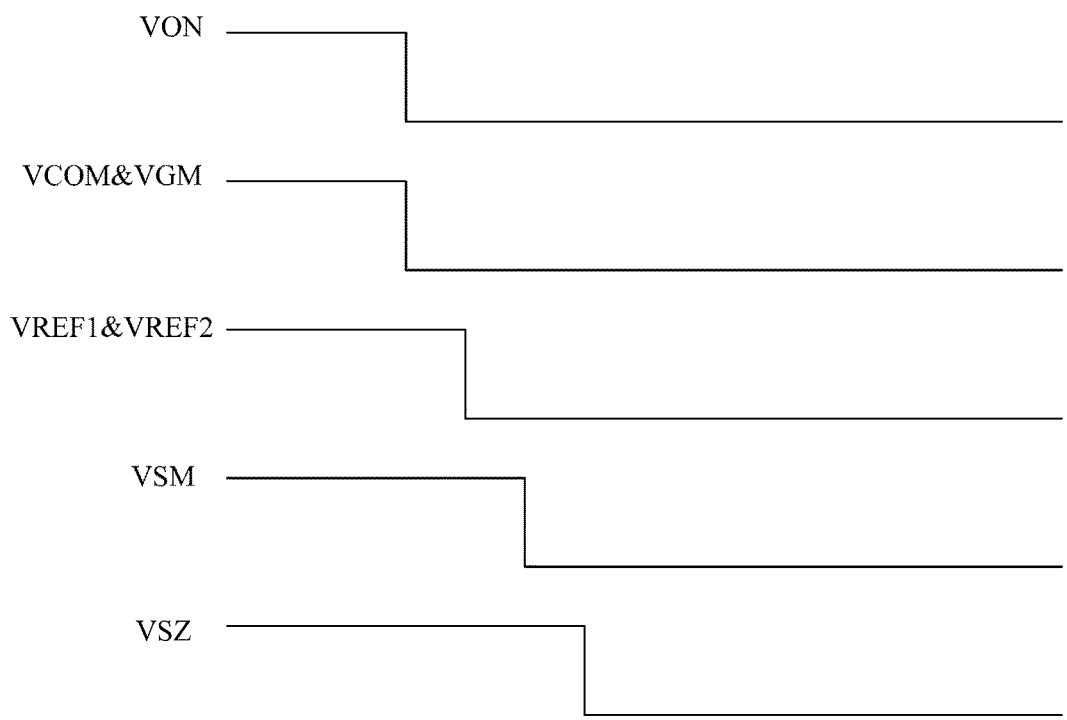
FIG. 5A is yet another timing chart of some signals in an embodiment of the present disclosure.

In some embodiments of the present disclosure, as shown in FIG. 1B, the driving voltage may include the gamma voltage VGM, the power supply analog voltage VSM, and the power supply digital voltage VSZ. In order to lower an influence on a device when output of the gamma voltage VGM, the power supply analog voltage VSM, and the power supply digital voltage VSZ is stopped, as shown in FIG. 5A, the power switching circuit 330 is further configured to, in response to the voltage stop signal VPN, successively stop outputting the gamma voltage VGM, the power supply analog voltage VSM, and the power supply digital voltage VSZ in sequence. That is, in response to the voltage stop signal VPN, the power switching circuit 330 first stops outputting the gamma voltage VGM, then stops outputting the power supply analog voltage VSM, and finally stops outputting the power supply digital voltage VSZ. Further, in some embodiments of the present disclosure, the driving voltage further includes the first reference voltage VREF1 and the second reference voltage VREF2. In order to lower an influence on the device when output of the first reference voltage VREF1, the second reference voltage VREF2, the gamma voltage VGM, the power supply analog voltage VSM, and the power supply digital voltage VSZ is stopped, the power switching circuit 330 is further configured to, after stopping outputting the gamma voltage VGM and before stopping outputting the power supply analog voltage VSM, simultaneously stop outputting the first reference voltage VREF1 and the second reference voltage VREF2. That is, in response to the voltage stop signal VPN, the power switching circuit 330 first stops outputting the gamma voltage VGM, then simultaneously stops outputting the first reference voltage VREF1 and the second reference voltage VREF2, then stops outputting the power supply analog voltage VSM, and finally stops outputting the power supply digital voltage VSZ.

Figure 5B:
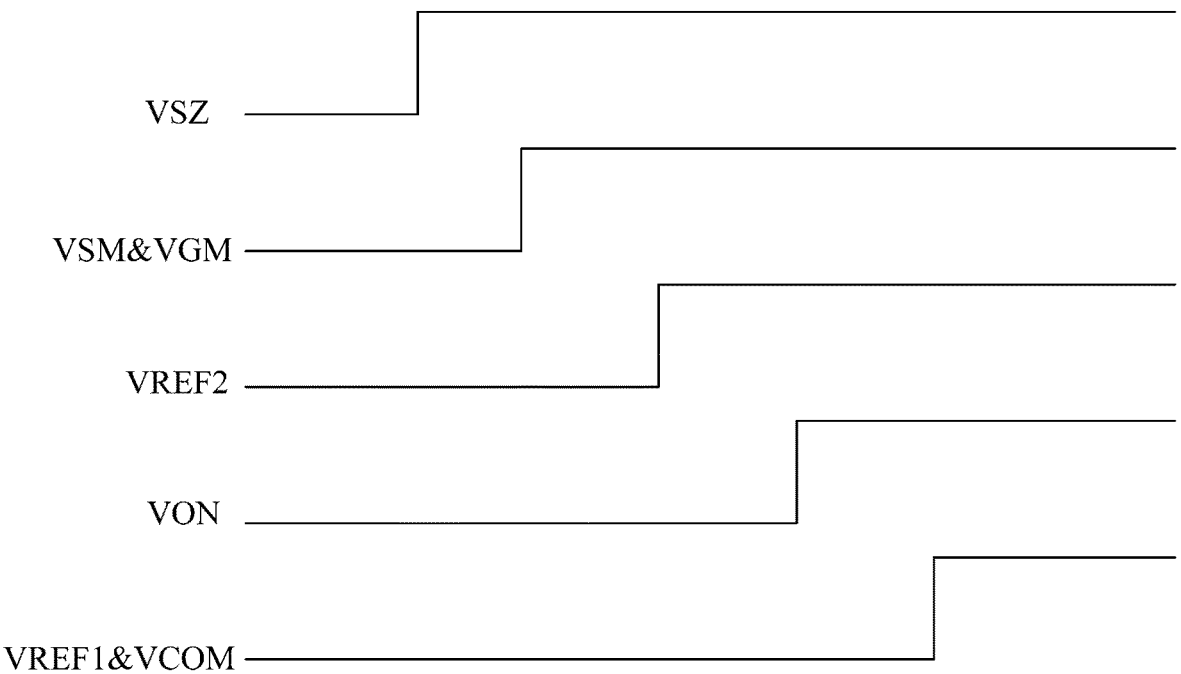
FIG. 5B is yet another timing chart of some signals in an embodiment of the present disclosure.

In some embodiments of the present disclosure, as shown in FIG. 1B, the driving voltage may include the gamma voltage VGM, the power supply analog voltage VSM, and the power supply digital voltage VSZ. In order to lower an influence on a device when output of the gamma voltage VGM, the power supply analog voltage VSM, and the power supply digital voltage VSZ is started, as shown in FIG. 5B, the power switching circuit 330 is further configured to, in response to the voltage start signal VPQ, first start outputting the power supply digital voltage VSZ and then simultaneously start outputting the gamma voltage VGM and the power supply analog voltage VSM. Further, in some embodiments of the present disclosure, the driving voltage further includes the first reference voltage VREF1 and the second reference voltage VREF2. In order to lower an influence on the device when output of the first reference voltage VREF1, the second reference voltage VREF2, the gamma voltage VGM, the power supply analog voltage VSM, and the power supply digital voltage VSZ is started, the power switching circuit 330 is further configured to, after starting outputting the power supply analog voltage VSM, first start outputting the second reference voltage VREF2 and then start outputting the first reference voltage VREF1.

In some embodiments of the present disclosure, the driving voltage may further include a common electrode voltage VCOM. In order to avoid the influence on the device when outputting of the above voltages is stopped or started, as shown in FIG. 1B and FIG. 5A, the power switching circuit 330 is further configured to, upon stopping outputting the gamma voltage VGM, stop outputting the common electrode voltage VCOM. As shown in FIG. 1B and FIG. 5B, the power switching circuit 330 is further configured to, upon starting outputting the first reference voltage VREF1, start outputting the common electrode voltage VCOM.

In some embodiments of the present disclosure, a triggering moment of a discharge enabling signal VON may be the same as a moment of stopping outputting the gamma voltage VGM. That is, the discharge enabling signal VON is triggered by the change in the voltage at the time of stopping the output of the gamma voltage VGM. Exemplarily, as shown in FIG. 5A, the power switching circuit 330 is further configured to, upon stopping outputting the gamma voltage VGM, trigger outputting the discharge enabling signal VON, so as to control the sub-pixels in the display panel 100 to release an electric charge. Exemplarily, the discharge enabling signal VON is sent to the level shifting circuit 360 and the source driving circuit 370. After receiving the discharge enabling signal VON, the level shifting circuit 360 outputs a high-level voltage to the gate driving circuit 110. The gate driving circuit 110 loads a high level on the gate lines according to the received high-level voltage so as to control the transistors in the sub-pixels to be all turned on to release the electric charge.

In some embodiments of the present disclosure, as shown in FIG. 1B and FIG. 4, the power switching circuit 330 has a reset pin PRE. The reset pin PRE is coupled with the level shifting circuit 360 and the source driving circuit 370. When the driving control apparatus 300 is powered on, after receiving the power voltage VCC, the power switching circuit 330 outputs a reset signal VRE through the reset pin PRE, and the reset signal VRE is sent to the level shifting circuit 360 and the source driving circuit 370. After receiving the reset signal VRE, the level shifting circuit 360 resets. After receiving the reset signal VRE, the source driving circuit 370 resets. Because the display panel 100 is in the power-on state, the system circuit 350 is outputting the power voltage VCC, so the reset signal VRE will not be output through the reset pin PRE. Upon stopping outputting the gamma voltage VGM, the power switching circuit 330 may output the discharge enabling signal VON through the reset pin PRE. In this way, no extra pin is designed, and the manufacturing difficulty is lowered.

Figure 6:
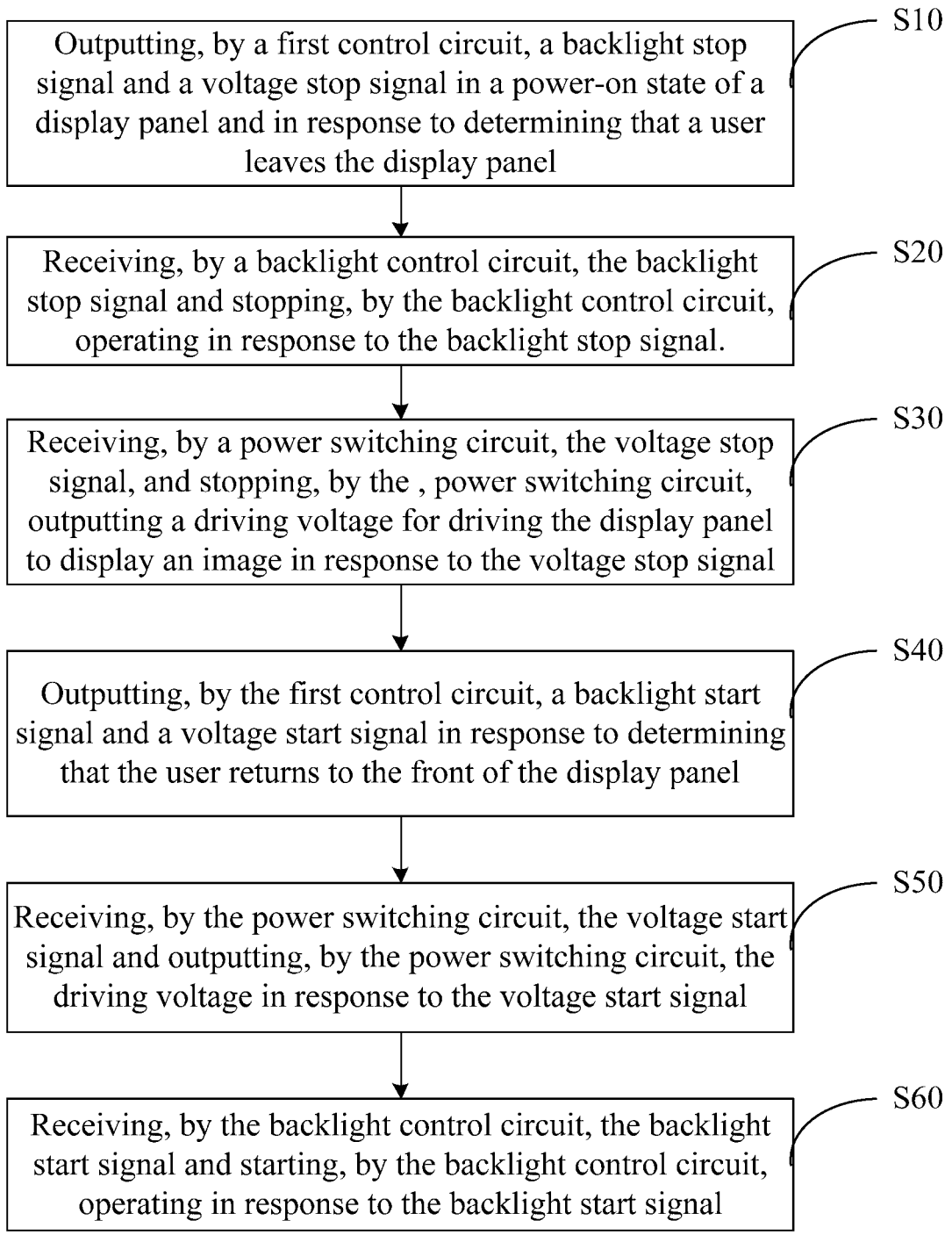
FIG. 6 is a flow chart of a driving control method in an embodiment of the present disclosure.

The embodiments of the present disclosure provide a driving control method, and as shown in FIG. 6, the driving control method may include the following steps.

S10, outputting, by a first control circuit, a backlight stop signal and a voltage stop signal in a power-on state of a display panel and in response to determining that a user leaves the display panel. An outputting moment of the backlight stop signal is before an outputting moment of the voltage stop signal.

S20, receiving, by a backlight control circuit, the backlight stop signal and stopping, by the backlight control circuit, operating in response to the backlight stop signal.

S30, receiving, by a power switching circuit, the voltage stop signal, and stopping, by the power switching circuit, outputting a driving voltage for driving the display panel to display an image in response to the voltage stop signal.

S40, outputting, by the first control circuit, a backlight start signal and a voltage start signal in response to determining that the user returns to the front of the display panel. An outputting moment of the backlight start signal is after an outputting moment of the voltage start signal.

S50, receiving, by the power switching circuit, the voltage start signal and outputting, by the power switching circuit, the driving voltage in response to the voltage start signal.

S60, receiving, by the backlight control circuit, the backlight start signal and starting, by the backlight control circuit, operating in response to the backlight start signal.

In some examples, stopping outputting the driving voltage for driving the display panel to display the image includes: stopping output of a gamma voltage, a power supply analog voltage and a power supply digital voltage successively in sequence, and upon stopping outputting the gamma voltage, triggering output of a discharge enabling signal, to control a sub-pixel in the display panel to release an electric charge.

The above driving control method provided by the embodiments of the present disclosure will be described below in combination with a structure of the driving control apparatus 300 in FIG. 1B.

In the power-on state of the display panel 100, the sensor circuit 340 may detect the front of the display panel 100 in real time so as to determine whether the user is in front of the display panel 100. Upon detecting that the user leaves the display panel 100, a first determination signal is sent to the first control circuit 310. The first control circuit 310, upon receiving the first determination signal, determines that the user leaves the display panel 100, and outputs the backlight stop signal VBN. The backlight control circuit 320 receives the backlight stop signal VBN and stops operating in response to the backlight stop signal VBN, and a backlight module 200 stops emitting light. After a first set duration (the first set duration may be 2 ms, 5 ms, etc., and of course may be determined according to the needs in actual application, which is not limited herein), the first control circuit 310 outputs the voltage stop signal VPN. The power switching circuit 330 receives the voltage stop signal VPN and, in response to the voltage stop signal VPN, first stops outputting the common electrode voltage VCOM and the gamma voltage VGM simultaneously, and at the same time outputs the discharge enabling signal VON through the reset pin PRE, and the discharge enabling signal VON is sent to the level shifting circuit 360 and the source driving circuit 370. After receiving the discharge enabling signal VON, the level shifting circuit 360 outputs a high-level voltage to a gate driving circuit 110. The gate driving circuit 110 loads a high level on gate lines according to the received high-level voltage so as to control the transistors in the sub-pixels to be all turned on to release the electric charge. Then, after 1 ms (or of course any other duration), the output of both the first reference voltage VREF1 and the second reference voltage VREF2 is stopped simultaneously. Then, after 1 ms (or of course any other duration), the output of the power supply analog voltage VSM is stopped. Then, after 1 ms (or of course any other duration), the output of the power supply digital voltage VSZ is stopped. It should be noted that, the power switching circuit 330 does not stop outputting a timing power supply voltage VTCON for supplying power to the first control circuit 310 so that the first control circuit 310 may be powered to communicate with the system circuit 350.

The sensor circuit 340 may continue to detect the front of the display panel 100 in real time so as to determine whether the user is in front of the display panel 100. In response to determining that the user returns to the front of the display panel 100, a second determination signal is issued to the first control circuit 310. Upon receiving the second determination signal, the first control circuit 310 determines that the user returns to the front of the display panel 100 and outputs the voltage start signal VPQ. The power switching circuit 330 receives the voltage start signal VPQ and, in response to the voltage start signal VPQ, first starts outputting the power supply digital voltage VSZ, and then after 7 ms (or of course any other duration), simultaneously starts outputting the power supply analog voltage VSM and the gamma voltage VGM. Then, after 10 ms (or of course any other duration), the output of the second reference voltage VREF2 is started. Then, after 8 ms (or of course any other duration), the reset pin PRE is changed from a state of outputting the discharge enabling signal VON (e.g., a pull-up state) to a state of non-discharge enabling signal VON (e.g., a pull-down state). Then, after 7 ms (or of course any other duration), the output of the first reference voltage VREF1 and the common electrode voltage VCOM is started simultaneously. After the first set duration (the first set duration may be 2 ms, 5 ms, etc., and of course may be determined according to the needs in actual application, which is not limited herein), the first control circuit 310 outputs the backlight start signal VBK. The backlight control circuit 320 receives the backlight start signal VBK and, in response to the backlight start signal VBK, starts operating so as to drive the backlight module 200 to emit light.

Figure 7:
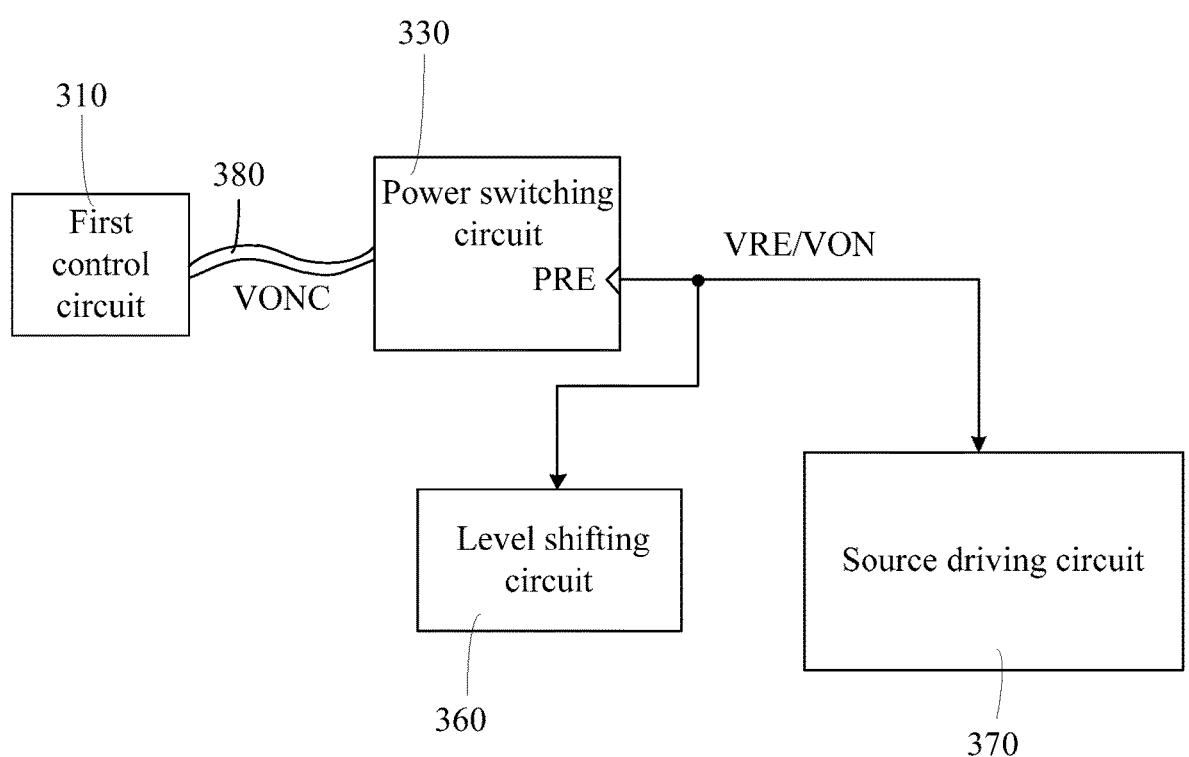
FIG. 7 is some other schematic structural diagrams of a driving control apparatus in an embodiment of the present disclosure.

The embodiments of the present disclosure provide some other schematic structural diagrams of a driving control apparatus, as shown in FIG. 7. The driving control apparatus is transformed in some ways compared to the implementations of the above embodiments. Only the differences between this embodiment and the above embodiments will be described below, and the similarities between them will not be repeated.

In some embodiments of the present disclosure, as shown in FIG. 7, the first control circuit 310 is further configured to output a discharge control signal VONC in the power-on state of the display panel 100 and in response to determining that the user leaves the display panel 100. The outputting moment of the backlight stop signal VBN is before an outputting moment of the discharge control signal VONC, and the outputting moment of the discharge control signal VONC is before the outputting moment of the voltage stop signal VPN. The power switching circuit 330 is further configured to receive the discharge control signal and, in response to the discharge control signal, output the discharge enabling signal VON so as to control sub-pixels in the display panel 100 to release an electric charge. Exemplarily, the power switching circuit 330 sends the discharge enabling signal VON to the level shifting circuit 360 and the source driving circuit 370. After receiving the discharge enabling signal VON, the level shifting circuit 360 outputs a high-level voltage to the gate driving circuit 110. The gate driving circuit 110 loads a high level on the gate lines according to the received high-level voltage so as to control the transistors in the sub-pixels to be all turned on to release the electric charge.

Exemplarily, as shown in FIG. 7, the first control circuit 310 is connected with the power switching circuit 330 through an IIC signal line 380. The first control circuit 310 transmits the discharge control signal VONC via the IIC signal line 380. The power switching circuit 330 receives the discharge control signal VONC via the IIC signal line 380 to initiate a function of controlling the release of electric charges.

In some embodiments of the present disclosure, as shown in FIG. 7, the power switching circuit 330 has a reset pin PRE. The reset pin PRE is coupled with the level shifting circuit 360 and the source driving circuit 370. When the driving control apparatus 300 is powered on, after receiving the power voltage VCC, the power switching circuit 330 may output a reset signal VRE through the reset pin PRE, and the reset signal VRE is sent to the level shifting circuit 360 and the source driving circuit 370. After receiving the reset signal VRE, the level shifting circuit 360 resets. After receiving the reset signal VRE, the source driving circuit 370 resets. Because the display panel 100 is in the power-on state, the system circuit 350 is outputting the power voltage VCC, so the reset signal VRE will not be output through the reset pin PRE. Upon stopping outputting the gamma voltage VGM, the power switching circuit 330 may output the discharge enabling signal VON through the reset pin PRE. In this way, no extra pin is designed, and the manufacturing difficulty is lowered.

In some embodiments of the present disclosure, the driving control method further includes: in the power-on state of the display panel 100, the first control circuit 310 further outputs the discharge control signal in response to determining that the user leaves the display panel 100. The outputting moment of the backlight stop signal VBN is before the outputting moment of the discharge control signal, and the outputting moment of the discharge control signal is before the outputting moment of the voltage stop signal VPN. The power switching circuit 330 further receives the discharge control signal and, in response to the discharge control signal, outputs the discharge enabling signal VON, so as to control the sub-pixels in the display panel 100 to release the electric charge.

The above driving control method provided by the embodiments of the present disclosure will be described below in combination with a structure of the driving control apparatus in FIG. 7.

In the power-on state of the display panel 100, the sensor circuit 340 may detect the front of the display panel 100 in real time so as to determine whether the user is in front of the display panel 100. Upon detecting that the user leaves the display panel 100, a first determination signal is sent to the first control circuit 310. The first control circuit 310, upon receiving the first determination signal, determines that the user leaves the display panel 100, and outputs the backlight stop signal VBN. The backlight control circuit 320 receives the backlight stop signal VBN and stops operating in response to the backlight stop signal VBN, and then the backlight module 200 stops emitting light. After a third set duration (the third set duration may be 2 ms, 5 ms, etc., and of course may be determined according to the needs in actual application, which is not limited herein), the first control circuit 310 outputs the discharge control signal. The power switching circuit 330 receives the discharge control signal and, in response to the discharge control signal, outputs the discharge enabling signal VON through the reset pin PRE. The discharge enabling signal VON is sent to the level shifting circuit 360 and the source driving circuit 370. After receiving the discharge enabling signal VON, the level shifting circuit 360 outputs a high-level voltage to the gate driving circuit 110. The gate driving circuit 110 loads a high level on gate lines according to the received high-level voltage so as to control the transistors in the sub-pixels to be all turned on to release the electric charge. After a fourth set duration (the fourth set duration may be 2 ms, 5 ms, etc., and of course may be determined according to the needs in actual application, which is not limited herein), the first control circuit 310 outputs the voltage stop signal VPN. The power switching circuit 330 receives the voltage stop signal VPN and, in response to the voltage stop signal VPN, first stops outputting the common electrode voltage VCOM and the gamma voltage VGM simultaneously. Then, after 1 ms (or of course any other duration), the output of both the first reference voltage VREF1 and the second reference voltage VREF2 is stopped simultaneously. Then, after 1 ms (or of course any other duration), the output of the power supply analog voltage VSM is stopped. Then, after 1 ms (or of course any other duration), the output of the power supply digital voltage VSZ is stopped. It should be noted that, the power switching circuit 330 does not stop outputting a timing power supply voltage VTCON for supplying power to the first control circuit 310 so that the first control circuit 310 may be powered to communicate with the system circuit 350.

The sensor circuit 340 may continue to detect the front of the display panel 100 in real time so as to determine whether the user is in front of the display panel 100. In response to determining that the user returns to the front of the display panel 100, a second determination signal is issued to the first control circuit 310. Upon receiving the second determination signal, the first control circuit 310 determines that the user returns to the front of the display panel 100 and outputs the voltage start signal VPQ The power switching circuit 330 receives the voltage start signal VPQ and, in response to the voltage start signal VPQ, first starts outputting the power supply digital voltage VSZ, and then after 7 ms (or of course any other duration), simultaneously starts outputting the power supply analog voltage VSM and the gamma voltage VGM. Then, after 10 ms (or of course any other duration), the output of the second reference voltage VREF2 is started. Then, after 8 ms (or of course any other duration), the reset pin PRE is changed from a state of outputting the discharge enabling signal VON (e.g., a pull-up state) to a state of non-discharge enabling signal VON (e.g., a pull-down state). Then, after 7 ms (or of course any other duration), the output of the first reference voltage VREF1 and the common electrode voltage VCOM is started simultaneously. After the first set duration (the first set duration may be 2 ms, 5 ms, etc., and of course may be determined according to the needs in actual application, which is not limited herein), the first control circuit 310 outputs the backlight start signal VBK. The backlight control circuit 320 receives the backlight start signal VBK and, starts operating in response to the backlight start signal VBK, to drive the backlight module 200 to emit light.

Figure 8:
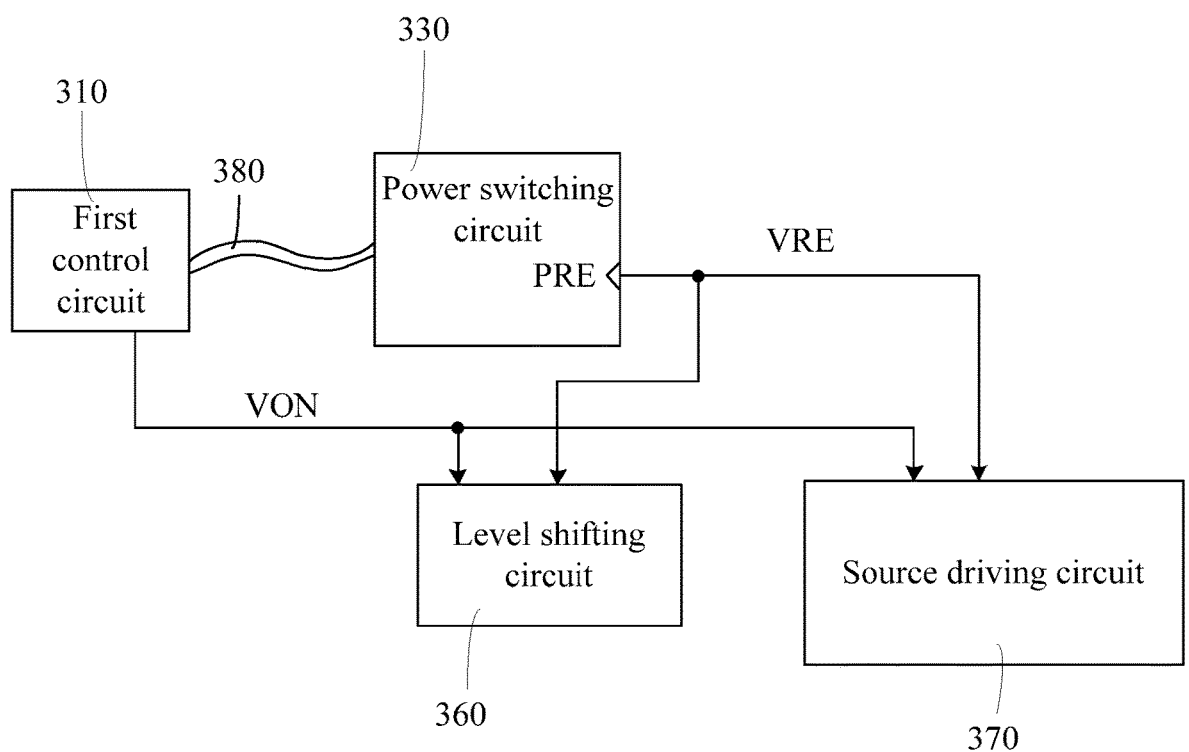
FIG. 8 is yet some schematic structural diagrams of a driving control apparatus in an embodiment of the present disclosure.

The embodiments of the present disclosure provide yet some schematic structural diagrams of a driving control apparatus, as shown in FIG. 8. The driving control apparatus is transformed in some ways compared to the implementations of the above embodiments. Only the differences between this embodiment and the above embodiments will be described below, and the similarities between them will not be repeated.

In some embodiments of the present disclosure, as shown in FIG. 8, the first control circuit 310 is further configured to output the discharge enabling signal VON in the power-on state of the display panel 100 and in response to determining that the user leaves the display panel 100, so as to control the sub-pixels in the display panel 100 to release the electric charge. The outputting moment of the backlight stop signal VBN is before the outputting moment of the discharge enabling signal VON, and the outputting moment of the discharge enabling signal VON is before the outputting moment of the voltage stop signal VPN. Exemplarily, the first control circuit 310 sends the discharge enabling signal VON to the level shifting circuit 360 and the source driving circuit 370. After receiving the discharge enabling signal VON, the level shifting circuit 360 outputs a high-level voltage to the gate driving circuit 110. The gate driving circuit 110 loads a high level on the gate lines according to the received high-level voltage so as to control the transistors in the sub-pixels to be all turned on to release the electric charge.

Exemplarily, the first control circuit 310 is connected with the level shifting circuit 360 and the source driving circuit 370 through a general purpose input/output port (GPIO). Meanwhile, the first control circuit 310 transmits the discharge enabling signal VON through a GPIO pin in the GPIO, and the level shifting circuit 360 and the source driving circuit 370 receive the discharge enabling signal VON through the GPIO pin.

The above driving control method provided by the embodiments of the present disclosure will be described below in combination with a structure of the driving control apparatus in FIG. 8.

In the power-on state of the display panel 100, the sensor circuit 340 may detect the front of the display panel 100 in real time so as to determine whether the user is in front of the display panel 100. Upon detecting that the user leaves the display panel 100, a first determination signal is sent to the first control circuit 310. The first control circuit 310, upon receiving the first determination signal, determines that the user leaves the display panel 100, and outputs the backlight stop signal VBN. The backlight control circuit 320 receives the backlight stop signal VBN and stops operating in response to the backlight stop signal VBN, and a backlight module 200 stops emitting light. After a fifth set duration (the fifth set duration may be 2 ms, 5 ms, etc., and of course may be determined according to the needs in actual application, which is not limited herein), the first control circuit 310 outputs the discharge enabling signal VON through the GPIO pin. The discharge enabling signal VON is sent to the level shifting circuit 360 and the source driving circuit 370. After receiving the discharge enabling signal VON, the level shifting circuit 360 outputs a high-level voltage to the gate driving circuit 110. The gate driving circuit 110 loads a high level on gate lines according to the received high-level voltage so as to control the transistors in the sub-pixels to be all turned on to release the electric charge. After a sixth set duration (the sixth set duration may be 2 ms, 5 ms, etc., and of course may be determined according to the needs in actual application, which is not limited herein), the first control circuit 310 outputs the voltage stop signal VPN. The power switching circuit 330 receives the voltage stop signal VPN, and first stops outputting the common electrode voltage VCOM and the gamma voltage VGM simultaneously in response to the voltage stop signal VPN. Then, after 1 ms (or of course any other duration), the output of both the first reference voltage VREF1 and the second reference voltage VREF2 is stopped simultaneously. Then, after 1 ms (or of course any other duration), the output of the power supply analog voltage VSM is stopped. Then, after 1 ms (or of course any other duration), the output of the power supply digital voltage VSZ is stopped. It should be noted that, the power switching circuit 330 does not stop outputting a timing power supply voltage VTCON for supplying power to the first control circuit 310 so that the first control circuit 310 may be powered to communicate with the system circuit 350.

The sensor circuit 340 may continue to detect the front of the display panel 100 in real time so as to determine whether the user is in front of the display panel 100. In response to determining that the user returns to the front of the display panel 100, a second determination signal is issued to the first control circuit 310. Upon receiving the second determination signal, the first control circuit 310 determines that the user returns to the front of the display panel 100 and outputs the voltage start signal VPQ. The power switching circuit 330 receives the voltage start signal VPQ and, in response to the voltage start signal VPQ, first starts outputting the power supply digital voltage VSZ, and then after 7 ms (or of course any other duration), simultaneously starts outputting the power supply analog voltage VSM and the gamma voltage VGM. Then, after 10 ms (or of course any other duration), the output of the second reference voltage VREF2 is started. Then, after 8 ms (or of course any other duration), the GPIO pin is changed from a state of outputting the discharge enabling signal VON (e.g., a pull-up state) to a state of non-discharge enabling signal VON (e.g., a pull-down state). Then, after 7 ms (or of course any other duration), the output of the first reference voltage VREF1 and the common electrode voltage VCOM is started simultaneously. After the first set duration (the first set duration may be 2 ms, 5 ms, etc., and of course may be determined according to the needs in actual application, which is not limited herein), the first control circuit 310 outputs the backlight start signal VBK. The backlight control circuit 320 receives the backlight start signal VBK and starts operating in response to the backlight start signal VBK, to drive the backlight module 200 to emit light.

Based on the same inventive concept, the embodiments of the present disclosure further provide a display apparatus, including the display panel, the backlight module and the driving control apparatus provided by the embodiments of the present disclosure. A problem-solving principle of the display apparatus is similar to that of the foregoing driving control apparatus. Therefore, for implementation of the display apparatus, reference may be made to the implementation of the foregoing driving control apparatus, and the repetitions will be omitted here.

In specific implementation, in the embodiment of the present disclosure, the display apparatus may be: a mobile phone, a tablet computer, a television, a display, a notebook computer, a digital photo frame, a navigator, or any other product or component with a display function. Other essential components of the display apparatus are understood by those of ordinary skill in the art, and will not be described in detail here, nor should they be used to limit the present disclosure.

According to the driving control apparatus, the driving control method and the display apparatus provided by the embodiments of the present disclosure, when the display panel is in the power-on state and it is determined that the user leaves the display panel, in order to lower the power consumption, the backlight stop signal may be first output, and the voltage stop signal is then output. The backlight control circuit stops operating in response to the backlight stop signal, such that the backlight module stops emitting light, and a screen of the display panel is thus turned off. In response to the voltage stop signal, the power switching circuit stops outputting the driving voltage for driving the display panel to display the image. When it is determined that the user returns to the front of the display panel, the voltage start signal may be first output, and the backlight start signal is then output. The backlight control circuit starts to operate in response to the backlight start signal, such that the backlight module starts to emit light. The power switching circuit outputs the driving voltage in response to the voltage start signal, such that the display panel can start to display the image.

Obviously, those of skill in the art can make various modifications and variations to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A driving control apparatus, comprising:
    a first control circuit, configured to, in a power-on state of a display panel, output a backlight stop signal and a voltage stop signal in response to determining that a user leaves the display panel, and output a backlight start signal and a voltage start signal in response to determining that the user returns to the front of the display panel; wherein an outputting moment of the backlight stop signal is before an outputting moment of the voltage stop signal, and an outputting moment of the backlight start signal is after an outputting moment of the voltage start signal;
    a backlight control circuit, configured to: receive the backlight stop signal, and stop operating in response to the backlight stop signal; and receive the backlight start signal, and start operating in response to the backlight start signal; and
    a power switching circuit, configured to: receive the voltage stop signal, and, in response to the voltage stop signal, stop outputting a driving voltage for driving the display panel to display an image; and receive the voltage start signal, and output the driving voltage in response to the voltage start signal; and
    a sensor circuit configured to, in the power-on state of the display panel, determine whether the user is in front of the display panel or not; and to issue a first determination signal to the first control circuit in response to determining that the user leaves the display panel, and issue a second determination signal to the first control circuit in response to determining that the user returns to the front of the display panel;
    wherein the first control circuit is further configured to determine that the user leaves the display panel upon receiving the first determination signal; and determine that the user returns to the front of the display panel upon receiving the second determination signal.

2. The driving control apparatus according to claim 1, wherein the driving voltage comprises a gamma voltage, a power supply analog voltage and a power supply digital voltage;
    the driving control apparatus further comprises: a source driving circuit, configured to load a data voltage on a data line in the display panel according to display data, the gamma voltage, the power supply analog voltage and the power supply digital voltage; and
    the power switching circuit is further configured to, in response to the voltage stop signal, successively stop outputting the gamma voltage, the power supply analog voltage and the power supply digital voltage in sequence; and to, in response to the voltage start signal, first start outputting the power supply digital voltage and then simultaneously start outputting the gamma voltage and the power supply analog voltage.

3. The driving control apparatus according to claim 2, wherein the driving voltage further comprises a first reference voltage and a second reference voltage;
    the driving control apparatus further comprises: a level shifting circuit, configured to output a driving clock signal according to a reference clock control signal, the first reference voltage and the second reference voltage, to control the display panel to load a gate scanning signal on a gate line; and
    the power switching circuit is further configured to simultaneously stop outputting the first reference voltage and the second reference voltage, subsequent to stopping outputting the gamma voltage and prior to stopping outputting the power supply analog voltage; and to first start outputting the second reference voltage and then start outputting the first reference voltage, subsequent to starting outputting the power supply analog voltage.

4. The driving control apparatus according to claim 3, wherein the driving voltage further comprises a common electrode voltage; and
    the power switching circuit is further configured to, upon stopping outputting the gamma voltage, stop outputting the common electrode voltage; and to, upon starting outputting the first reference voltage, start outputting the common electrode voltage.

5. The driving control apparatus according to claim 2, wherein the power switching circuit is further configured to, upon stopping outputting the gamma voltage, trigger outputting a discharge enabling signal, to control a sub-pixel in the display panel to release an electric charge.

6. The driving control apparatus according to claim 5, wherein the power switching circuit outputs the discharge enabling signal through a reset pin.

7. The driving control apparatus according to claim 1, wherein the first control circuit is further configured to, in the power-on state of the display panel, output a discharge control signal in response to determining that the user leaves the display panel, wherein the outputting moment of the backlight stop signal is before an outputting moment of the discharge control signal, and the outputting moment of the discharge control signal is before the outputting moment of the voltage stop signal; and
    the power switching circuit is further configured to receive the discharge control signal, and output a discharge enabling signal in response to the discharge control signal, to control a sub-pixel in the display panel to release an electric charge.

8. The driving control apparatus according to claim 7, wherein the power switching circuit outputs the discharge enabling signal through a reset pin.

9. The driving control apparatus according to claim 1, wherein the first control circuit is further configured to, in the power-on state of the display panel, output a discharge enabling signal in response to determining that the user leaves the display panel, to control a sub-pixel in the display panel to release an electric charge; wherein the outputting moment of the backlight stop signal is before an outputting moment of the discharge enabling signal, and the outputting moment of the discharge enabling signal is before the outputting moment of the voltage stop signal.

10. A driving control method, comprising:
determining, by a sensor circuit, in a power-on state of a display panel whether a user is in front of the display panel or not;
issuing, by the sensor circuit, a first determination signal to a first control circuit in response to determining that the user leaves the display panel;
determining, by the first control circuit, the user leaves the display panel upon receiving the first determination signal;
outputting, by the first control circuit, a backlight stop signal and a voltage stop signal in the power-on state of a display panel and in response to determining that the user leaves the display panel; wherein an outputting moment of the backlight stop signal is before an outputting moment of the voltage stop signal;
receiving, by a backlight control circuit, the backlight stop signal, and stopping, by the backlight control circuit, operating in response to the backlight stop signal;
receiving, by a power switching circuit, the voltage stop signal, and stopping, by the power switching circuit, outputting a driving voltage for driving the display panel to display an image in response to the voltage stop signal;
issuing, by the sensor circuit, a second determination signal to the first control circuit in response to determining that the user returns to the front of the display panel;
determining, by the first control circuit, the user returns to the front of the display panel upon receiving the second determination signal;
outputting, by the first control circuit, a backlight start signal and a voltage start signal in response to determining that the user returns to the front of the display panel; wherein an outputting moment of the backlight start signal is after an outputting moment of the voltage start signal;
receiving, by the power switching circuit, the voltage start signal, and outputting, by the power switching circuit, the driving voltage in response to the voltage start signal; and
receiving, by the backlight control circuit, the backlight start signal, and starting, by the backlight control circuit, operating in response to the backlight start signal.

11. The driving control method according to claim 10, wherein the driving voltage comprises a gamma voltage, a power supply analog voltage and a power supply digital voltage; and
the stopping outputting a driving voltage for driving the display panel to display an image comprises:
stopping outputting the gamma voltage, the power supply analog voltage and the power supply digital voltage successively in sequence, and triggering outputting a discharge enabling signal upon stopping outputting the gamma voltage, to control a sub-pixel in the display panel to release an electric charge.

12. The driving control method according to claim 10, wherein the first control circuit, in the power-on state of the display panel, further outputs a discharge control signal in response to determining that the user leaves the display panel; wherein the outputting moment of the backlight stop signal is before an outputting moment of the discharge control signal, and the outputting moment of the discharge control signal is before the outputting moment of the voltage stop signal; and
the power switching circuit further receives the discharge control signal and outputs the discharge enabling signal in response to the discharge control signal, to control a sub-pixel in the display panel to release an electric charge.

13. The driving control method according to claim 10, wherein the first control circuit, in the power-on state of the display panel, further outputs a discharge enabling signal in response to determining that the user leaves the display panel, to control a sub-pixel in the display panel to release an electric charge; wherein the outputting moment of the backlight stop signal is before an outputting moment of the discharge enabling signal, and the outputting moment of the discharge enabling signal is before the outputting moment of the voltage stop signal.

14. A display apparatus, comprising the driving control apparatus according to claim 1.

15. A driving control apparatus, comprising:
a first control circuit, configured to, in a power-on state of a display panel, output a backlight stop signal and a voltage stop signal in response to determining that a user leaves the display panel, and output a backlight start signal and a voltage start signal in response to determining that the user returns to the front of the display panel; wherein an outputting moment of the backlight stop signal is before an outputting moment of the voltage stop signal, and an outputting moment of the backlight start signal is after an outputting moment of the voltage start signal;
a backlight control circuit, configured to: receive the backlight stop signal, and stop operating in response to the backlight stop signal; and receive the backlight start signal, and start operating in response to the backlight start signal; and
a power switching circuit, configured to: receive the voltage stop signal, and, in response to the voltage stop signal, stop outputting a driving voltage for driving the display panel to display an image; and receive the voltage start signal, and output the driving voltage in response to the voltage start signal;
wherein the driving voltage comprises a gamma voltage, a power supply analog voltage and a power supply digital voltage;
the power switching circuit is further configured to, in response to the voltage stop signal, successively stop outputting the gamma voltage, the power supply analog voltage and the power supply digital voltage in sequence; and to, in response to the voltage start signal, first start outputting the power supply digital voltage and then simultaneously start outputting the gamma voltage and the power supply analog voltage.

16. The driving control apparatus according to claim 15, wherein the power switching circuit is further configured to, upon stopping outputting the gamma voltage, trigger outputting a discharge enabling signal, to control a sub-pixel in the display panel to release an electric charge.

17. The driving control apparatus according to claim 15, wherein the first control circuit is further configured to, in the power-on state of the display panel, output a discharge control signal in response to determining that the user leaves the display panel, wherein the outputting moment of the backlight stop signal is before an outputting moment of the discharge control signal, and the outputting moment of the discharge control signal is before the outputting moment of the voltage stop signal; and the power switching circuit is further configured to receive the discharge control signal, and output a discharge enabling signal in response to the discharge control signal, to control a sub-pixel in the display panel to release an electric charge.

18. The driving control apparatus according to claim 15, wherein the first control circuit is further configured to, in the power-on state of the display panel, output a discharge enabling signal in response to determining that the user leaves the display panel, to control a sub-pixel in the display panel to release an electric charge; wherein the outputting moment of the backlight stop signal is before an outputting moment of the discharge enabling signal, and the outputting moment of the discharge enabling signal is before the outputting moment of the voltage stop signal.

19. The driving control apparatus according to claim 15, further comprising: a sensor circuit; wherein the sensor circuit is configured to, in the power-on state of the display panel, determine whether the user is in front of the display panel or not; and to issue a first determination signal to the first control circuit in response to determining that the user leaves the display panel, and issue a second determination signal to the first control circuit in response to determining that the user returns to the front of the display panel; and the first control circuit is further configured to determine that the user leaves the display panel upon receiving the first determination signal; and determine that the user returns to the front of the display panel upon receiving the second determination signal.

\* \* \* \* \*